US011995554B2

(12) United States Patent  
Guo et al.

(10) Patent No.: US 11,995,554 B2  
(45) Date of Patent: May 28, 2024

(54) APPARATUS AND METHODS FOR BACKWARD PROPAGATION IN NEURAL NETWORKS SUPPORTING DISCRETE DATA

(71) Applicant: Cambricon Technologies Corporation Limited, Beijing (CN)

(72) Inventors: Qi Guo, Beijing (CN); Yong Yu, Beijing (CN); Tianshi Chen, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 590 days.

(21) Appl. No.: 16/182,439

(22) Filed: Nov. 6, 2018

(65) Prior Publication Data

US 2019/0080241 A1 Mar. 14, 2019

Related U.S. Application Data

(63) Continuation-in-part of application No. 16/093,958, filed as application No. PCT/CN2016/079443 on Apr. 15, 2016, now abandoned.

(51) Int. Cl.
*G06N 3/084* (2023.01)
*G06N 3/063* (2023.01)
(Continued)

(52) U.S. Cl.
CPC ............. *G06N 3/084* (2013.01); *G06N 3/063* (2013.01); *G06F 9/3016* (2013.01);
(Continued)

(58) Field of Classification Search
CPC ............ G06N 20/00; G06N 7/00; G06N 3/08; G06N 3/084; G06N 3/0454; G06N 3/04; G06N 3/063; G06F 9/3016; G06F 9/3836
See application file for complete search history.

(56) References Cited

U.S. PATENT DOCUMENTS 9,846,660 B2 * 12/2017 Styles ................. G06F 13/1689  
10,311,342 B1 * 6/2019 Farhadi .................... G06K 9/52  
(Continued)

FOREIGN PATENT DOCUMENTS

WO 2016037351 A1 3/2016

OTHER PUBLICATIONS

Soudry et al., "Memristor-Based Multilayer Neural Networks with Online Gradient Descent Training" 2015, pp. 2408-2421. (Year: 2015).*

(Continued)

*Primary Examiner* — Incent Gonzales  
*Assistant Examiner* — Chase P. Hinckley  
(74) *Attorney, Agent, or Firm* — Getech Law LLC; Jun Ye

(57) ABSTRACT

Aspects for backpropagation of a multilayer neural network (MNN) in a neural network processor are described herein. The aspects may include a computation module configured to receive one or more groups of MNN data. The computation module may further include a master computation module configured to calculate an input gradient vector based on a first output gradient vector from an adjacent layer and based on a data type of each of the one or more groups of MNN data. Further still, the computation module may include one or more slave computation modules configured to parallelly calculate portions of a second output vector based on the input gradient vector calculated by the master computation module and based on the data type of each of the one or more groups of MNN data.

23 Claims, 10 Drawing Sheets

(51) Int. Cl.

| | |
|---|---|
| G06F 9/30 | (2018.01) |
| G06F 9/38 | (2018.01) |
| G06N 3/04 | (2023.01) |
| G06N 3/048 | (2023.01) |
| G06N 20/00 | (2019.01) |

(52) U.S. Cl.
CPC .............. *G06F 9/3826* (2013.01); *G06N 3/04* (2013.01); *G06N 3/048* (2023.01); *G06N 20/00* (2019.01)

(56) References Cited

U.S. PATENT DOCUMENTS

| | | | | |
|---|---|---|---|---|
| 10,521,715 | B1* | 12/2019 | Loffe | G06N 3/08 |
| 10,540,588 | B2* | 1/2020 | Burger | G06F 15/7803 |
| 10,586,151 | B1* | 3/2020 | Teig | G06N 3/08 |
| 10,776,690 | B2* | 9/2020 | Henry | G06N 3/04 |
| 10,831,444 | B2* | 11/2020 | El-Yaniv | G06F 7/48 |
| 2013/0311412 | A1* | 11/2013 | Lazar | H03M 1/82 706/16 |
| 2014/0136459 | A1* | 5/2014 | James, III | G06N 3/04 706/26 |
| 2016/0034814 | A1* | 2/2016 | Audhkhasi | G06N 3/08 706/12 |
| 2016/0162782 | A1* | 6/2016 | Park | G06N 3/082 706/17 |
| 2016/0328646 | A1* | 11/2016 | Lin | G06V 10/454 |
| 2016/0335120 | A1* | 11/2016 | Gupta | G06F 9/547 |
| 2017/0091619 | A1* | 3/2017 | Towal | G06N 3/0472 |
| 2017/0185897 | A1* | 6/2017 | Droppo | G06F 11/0721 |
| 2017/0243110 | A1* | 8/2017 | Zamora Esquivel | G06N 3/08 |
| 2017/0286830 | A1* | 10/2017 | El-Yaniv | G06N 3/0454 |
| 2018/0376165 | A1* | 12/2018 | Alshin | H04N 19/537 |
| 2019/0073582 | A1* | 3/2019 | Yang | G06F 17/11 |
| 2019/0147365 | A1* | 5/2019 | Yagnik | G06N 3/0454 706/12 |
| 2019/0294967 | A1* | 9/2019 | Kumar | G06N 3/0454 |

OTHER PUBLICATIONS

Aliaga et al., "SoC-Based Implementation of the Backpropagation Algorithm for MLP" 2008, pp. 744-749. (Year: 2008).*
Tanomoto et al., "A CGRA-based Approach for Accelerating Convolutional Neural Networks" 2015, pp. 73-80. (Year: 2015).*
Lin et al., "Neural Networks with Few Multiplications" Feb. 26, 2016, pp. 1-9. (Year: 2016).*
Andrychowicz et Kurach, "Learning Efficient Algorithms with Hierarchical Attentive Memory" Feb. 23, 2016, pp. 1-10. (Year: 2016).*
Kim et al., "Compression of Deep Convolutional Neural Networks for Fast and Low Power Mobile Applications" Feb. 24, 2016, pp. 1-16. (Year: 2016).*
Lashgar et Baniasadi, "Employing Software-Managed Caches in OpenACC: Opportunities and Benefits" Feb. 2016, pp. 1-34. (Year: 2016).*
Suda et al., "Throughput-Optimized OpenCL-based FPGA Accelerator for Large-Scale Convolutional Neural Networks" Feb. 2016, pp. 16-25. (Year: 2016).*
Soudry et al., "Expectation Backpropagation: Parameter-Free Training of Multilayer Neural Networks with Continuous or Discrete Weights" Dec. 2014, pp. 1-21. (Year: 2014).*
Lee, HyoukJoong, "High-Level Language Compilers for Heterogeneous Accelerators" Mar. 2016, pp. i-130. (Year: 2016).*
Courbariaux et al., "Binarized Neural Networks: Training Neural Networks with Weights and Activations Constrained to +1 or -1" Mar. 17, 2016, pp. 1-11. (Year: 2016).*
Brown et al., "Have Abstraction and Eat Performance, Too: Optimized Heterogeneous Computing with Parallel Patterns" Mar. 2016, pp. 194-2015. (Year: 2016).*
Qiu et al., "Going Deeper with Embedded FPGA Platform for Convolutional Neural Network" Feb. 2016, pp. 26-35. (Year: 2016).*
Gu et al., "MuProp: Unbiased Backpropagation for Stochastic Neural Networks" Feb. 25, 2016, pp. 1-12. (Year: 2016).*
Dettmers, Tim, "8-bit Approximations for Parallelism in Deep Learning" Feb. 19, 2016, pp. 1-14. (Year: 2016).*
Gysel et al., "Hardware-Oriented Approximation of Convolutional Neural Networks" Apr. 11, 2016, pp. 1-8. (Year: 2016).*
Mahajan et al., "TABLA: A Unified Template-based Framework for Accelerating Statistical Machine Learning" Mar. 2016, pp. 14-26. (Year: 2016).*
Prabhakar et al., "Generating Configurable Hardware from Parallel Patterns" Apr. 2, 2016, pp. 651-665. (Year: 2016).*
Wang et al., "Deep Learning at Scale and at Ease" Mar. 25, 2016, pp. 1-23. (Year: 2016).*
Yuan et al., "CP-FPGA: A Computation Data-Aware Software/Hardware Co-design for Nonvolatile FPGAs based on Checkpointing Techniques" Jan. 2016, pp. 569-574. (Year: 2016).*
El-Yaniv et al., "Quantized Neural Network Training and Inference" Apr. 4, 2016, U.S. Appl. No. 62/317,665, arXiv: 1602.02505v2. (Year: 2016).*
Martins et al., "From Softmax to Sparsemax: A Sparse Model of Attention and Multi-Label Classification" Feb. 8, 2016, arXiv: 1602.02068v2. (Year: 2016).*
Vincent et al., "Efficient Exact Gradient Update for training Deep Networks with Very Large Sparse Targets" Jul. 14, 2015, pp. 1-15. (Year: 2015).*
Schulman et al., "Gradient Estimation Using Stochastic Computation Graphs" Jan. 5, 2016, pp. 1-13. (Year: 2016).*
Bojnordi et Ipek, "Memristive Boltzmann Machine: A Hardware Accelerator for Combinatorial Optimization and Deep Learning" Mar. 2016, pp. 1-13. (Year: 2016).*
Han et al., "EIE: Efficient Inference Engine on Compressed Deep Neural Network" Feb. 4, 2016, pp. 1-12. (Year: 2016).*
EP16898264.3; Official Action dated Dec. 3, 2019, 11 Pages.
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks", The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS 14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
EP16898264.3; European Search Report dated Nov. 25, 2019, 6 Pages.
Lin et al.; "Neural Networks with Few Multiplications"; Conference Paper / ICLR, Feb. 26, 2016, 9 pages.
Domingos et al.; "An Efficient and Scalable Architecture for Neural Networks With Backpropagation Learning"; Dept. of Electrical and Computer Engineering, Aug. 24, 2005, 6 pages.

(56) References Cited

OTHER PUBLICATIONS

Soudry et al.; "Expectation Backpropagation: Parameter-Free Training of Multilayer Neural Networks with Continuous or Discrete Weights"; NIPS'14 Proceedings of the 27th International Conference on Neural Information Processing Systems, Dec. 8, 2014; 9 pages.
EP 16898264.3—Communication Pursuant to Article 94(3) EPC, dated Dec. 11, 2020, 4 pages.
EP 16898264.3—Response to Article 94(3) EPC, filed Dec. 16, 2020, 27 pages.
EP 16898264.3—Response to Article 94(3) EPC, filed Oct. 9, 2020, 71 pages.
CN 201610237268.6—Office Action, dated Aug. 14, 2020, 8 pages. (with brief English explanation).
PCT/CN2016/079443—International Search Report, dated Jan. 18, 2017, 15 pages. (with brief English explanation).

* cited by examiner

APPARATUS AND METHODS FOR BACKWARD PROPAGATION IN NEURAL NETWORKS SUPPORTING DISCRETE DATA

CROSS-REFERENCE TO RELATED APPLICATIONS

This application is a continuation-in-part of U.S. patent application Ser. No. 16/093,958, filed on Oct. 15, 2018, which is a 35 U.S.C § 371 U.S. National Stage Application corresponding to PCT Application no. PCT/CN2016/079443, filed Apr. 15, 2016. The entire content of each of the aforementioned patent applications, are incorporated herein by reference.

TECHNICAL FIELD

The present disclosure generally relates to the technical field of artificial neural network, and specifically, relates to an apparatus and method for executing the backpropagation of the artificial neural network supporting discrete data.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention.

A known method to support the backpropagation of a multilayer artificial neural network is to use a general-purpose processor. Such a method uses a general-purpose register file and a general-purpose functional unit to execute general purpose instructions to support algorithms for MNNs. However, one of the defects of the method is lower operational performance of a single general-purpose processor which cannot meet performance requirements for usual multilayer neural network operations. When one or more general-purpose processors execute concurrently, the intercommunication among them also becomes a performance bottleneck. In addition, a general-purpose processor needs to decode the reverse computation of a multilayer artificial neural network into a long queue of computations and access instruction sequences, and a front-end decoding on the processor brings about higher power consumption.

Another known method to support the backpropagation of the multilayer artificial neural network is to use a graphics processing unit (GPU). Such a method uses a general-purpose register file and a general-purpose stream processing unit to execute general purpose single-instruction-multiple-data (SIMD) instructions to support the algorithm. Since GPU is an apparatus specially for executing graph and image operation as well as scientific computation and fails to specially support multilayer artificial neural network operations, the GPU remains in need of a great amount of front-end decoding to execute multilayer artificial neural network operations, thus producing plenty of additional overheads. Besides, since GPU only contains rather small on-chip caching, then model data (weight values) of a multilayer artificial neural network may be repeatedly moved from the off-chip, and off-chip bandwidth becomes a main performance bottleneck, causing huge power consumption.

Discrete data representation may refer to designating one or more numbers to represent one or more discrete values. For example, typically, binary numbers, 00, 01, 10, and 11, represent continuous values, 0, 1, 2, and 3. In some examples of discrete data representation, the four binary numbers (00, 01, 10, and 11) may be designated to respectively represent discrete values, e.g., −1, −⅛, ⅛, and 1.

According to conventional methods, computing devices for MNNs may implement continuous data representation to store floating-point numbers and/or fixed-point numbers. However, MNNs may include numerous weight values that of relatively high precision and, thus, continuous data representation may lead to large consumption of computational resources and storage space. Unlike continuous data representation, discrete data representation may require less complex hardware design and less storage space.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for backpropagation of a multilayer neural network (MNN). The example apparatus may include a direct memory access unit configured to exchange one or more groups of MNN data with a storage device. The one or more groups of MNN data include input data and one or more weight values. At least a portion of the input data and the weight values are presented as discrete values. The example apparatus may further include a plurality of computation modules connected via an interconnection unit. The computation modules may include a master computation module configured to calculate an input gradient vector based on a first output gradient vector from an adjacent layer and based on a data type of each of the one or more groups of MNN data, and one or more slave computation modules configured to parallelly calculate portions of a second output vector based on the input gradient vector calculated by the master computation module and based on the data type of each of the one or more groups of MNN data.

Another example aspect of the present disclosure provides an example method for backpropagation of a multilayer neural network (MNN). The example method may include exchanging, by a direct memory access unit, one or more groups of MNN data. The one or more groups of MNN data include input data and one or more weight values. At least a portion of the input data and the weight values are presented as discrete values. Further, the example method may include calculating, by a master computation module, an input gradient vector based on a first output gradient vector from an adjacent layer and based on a data type of each of the one or more groups of MNN data. Further still, the example method may include parallelly calculating, by one or more slave computation modules connected to the master computation module via an interconnection unit, portions of a second output vector based on the input gradient vector calculated by the master computation module and based on the data type of each of the one or more groups of MNN data.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1A:
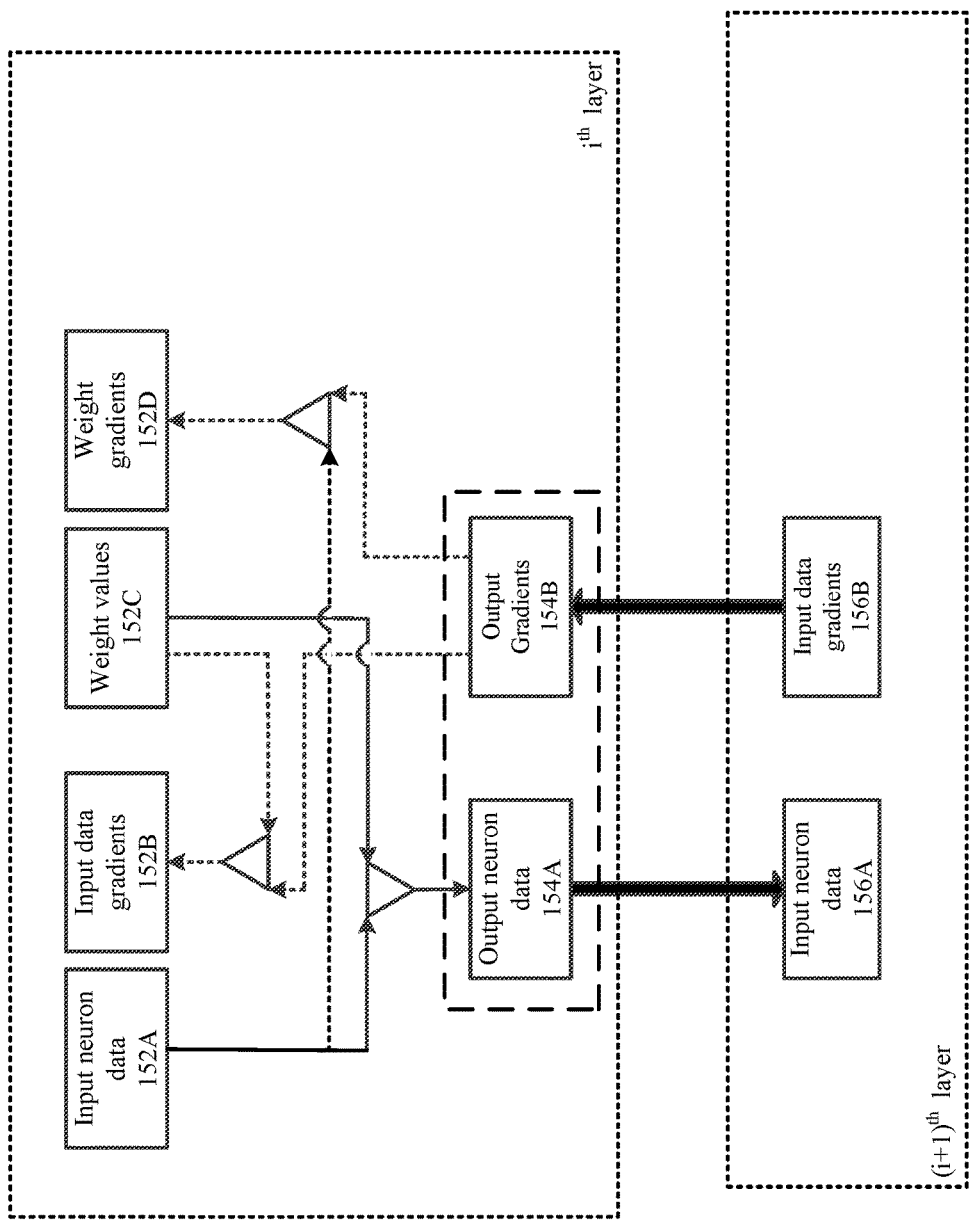
FIG. 1A is a block diagram illustrating an example computing process for MNNs.

FIG. 1A is a block diagram illustrating an example computing process 100 at an MNN acceleration processor for neural networks. The computing process 100 is a merely example showing neural network operations that involve input data and weight values and is not limited to such operations. For example, other unshown neural network operations may include pooling operations, etc.

As depicted, the example computing process 100 may be performed from the $i^{th}$ layer to the $(i+1)^{th}$ layer. The term "layer" here may refer to a group of operations, rather than a logic or a physical layer. A triangular-shaped operator (Δ as shown in FIG. 1) may indicate one or more neural network operations. Examples of the neural network operations may include an activation function, a bias operation, a matrix multiplication, a convolution operation, or any combination thereof. As described below in greater detail, the computing process from the $i^{th}$ layer to the $(i+1)^{th}$ layer may be referred to as a forward propagation process; the computing process from $(i+1)^{th}$ layer to the $i^{th}$ layer may be referred to as a backward propagation (also may be interchangeably referred to as backpropagation) process.

The forward propagation process may start from input neuron data received at the $i^{th}$ layer (e.g., input neuron data 152A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 152A may be multiplied or convolved by one or more weight values 152C. The results of the multiplication or convolution may be transmitted as output data neuron 154A. The output neuron data 154A may be transmitted to the next layer (e.g., the $(i+1)^{th}$ layer) as input neuron data 156A. The forward propagation process may be shown as the solid lines in FIG. 1A.

The backward propagation process may start from the last layer of the forward propagation process. For example, the backward propagation process may include the process from the $(i+1)^{th}$ layer to the $i^{th}$ layer. During the process, the input data gradients 156B may be transmitted to the $i^{th}$ layer as output gradients 154B. The output gradients 154B may then be multiplied or convolved by the input neuron data 152A to generate weight gradients 152D. Additionally, the output gradients 154B may be multiplied by the weight values 152C to generate input data gradients 152B. The backward propagation process may be shown as the dotted lines in FIG. 1A.

In some examples, input data and weight values represented and stored as continuous data may be converted to discrete values. Thus, the dot production operations in the MNN may be broken down to sub-operations including bit-shifting, bitwise NOT (or complement), exclusive OR (or exclusive disjunction), or any combination thereof. Further, with respect to each layer, a data type (i.e., discrete or continuous data) of the input neuron data or the weight values at the layer may be selected by a system administrator prior to the forward propagation process. If discrete data is selected for a layer, the system administrator may further set the bit length of discrete data for this layer. For example, the bit length of the discrete data may be set to 1 bit, 2 bits, or 3 bits. Respectively, the discrete data may represent 2, 4, or 8 discrete values.

Figure 1B:
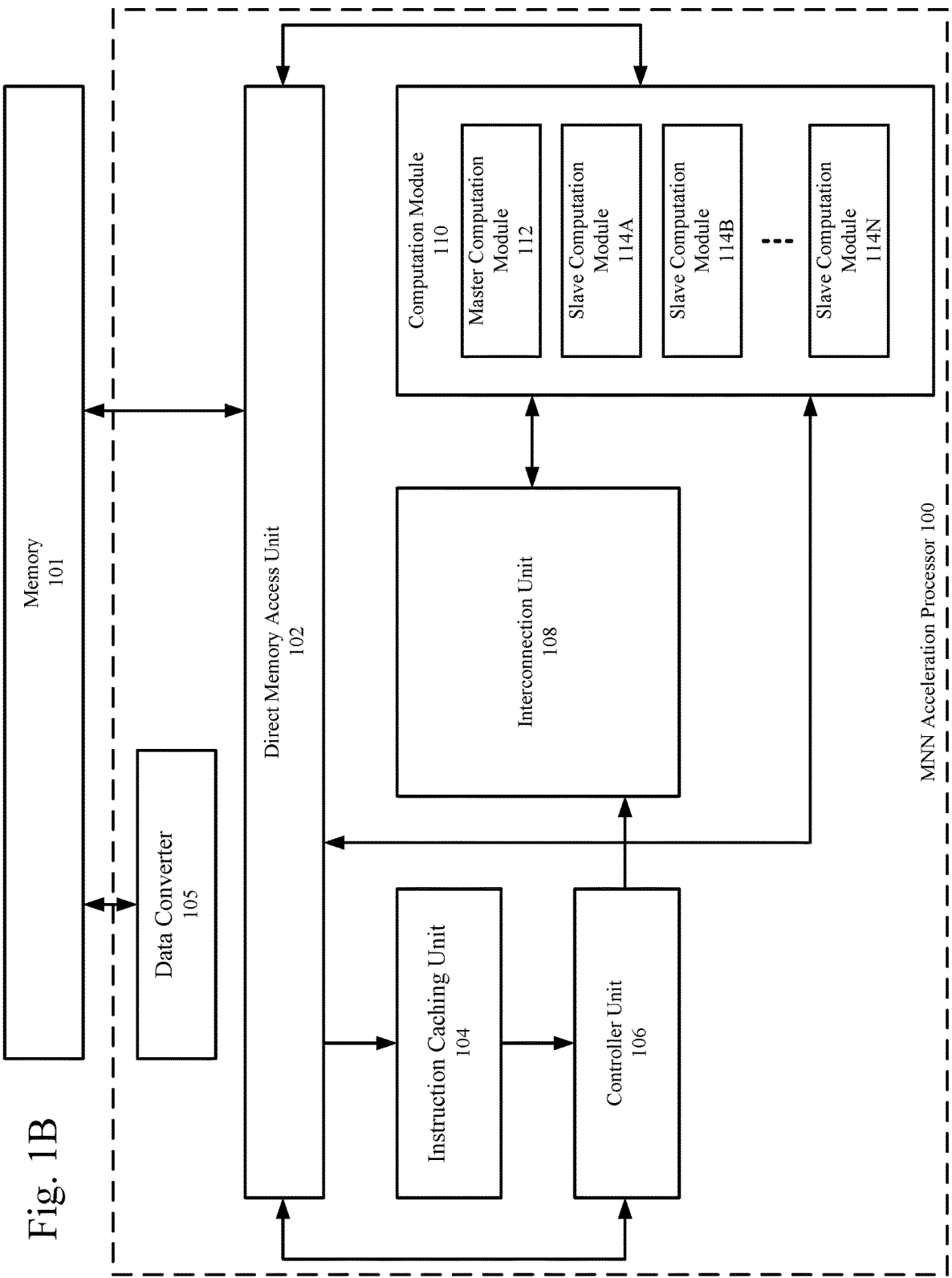
FIG. 1B illustrates a block diagram of the overall structure of a neural network processor for performing a backpropagation operation of artificial neural networks according to embodiments of the present disclosure.

FIG. 1B is an exemplary block diagram of an overall structure of an MNN acceleration processor 100 for executing the backpropagation of the multilayer neural network according to examples of the present disclosure. As shown in FIG. 1B, the apparatus comprises an instruction caching unit 104, a data converter 105, a controller unit 106, a direct memory access unit 102, an interconnection unit 108, a computation module 110 that may include a master computation module 112, and one or more slave computation modules 114 (e.g., 114A, 114B . . . 114N). Any of the above-mentioned components or devices may be implemented by a hardware circuit (e.g., application specific integrated circuit (ASIC)).

In some examples, the instruction caching unit 104 may be configured to receive or read instructions from the direct memory access unit 102 and cache the received instructions. The controller unit 106 may be configured to read instructions from the instruction caching unit 104 and decode one of the instructions into micro-instructions for controlling operations of other modules including the direct memory access unit 102, the master computation module 112, the slave computation modules 114, etc. In other words, the modules including the direct memory access unit 102, the master computation module 112, and the slave computation modules 114 may be configured to respectively perform the micro-instructions.

The direct memory access unit 102 may be configured to access an external address range (e.g., in an external storage device such as a memory 101) and directly read or write data into respective caching units in the computation module 110.

In some examples, the data converter 105 may be configured to receive continuous data from the memory 101 and convert the continuous data into discrete data that may represent multiple discrete values. The discrete data may be further transmitted back to the memory 101.

Figure 1C:
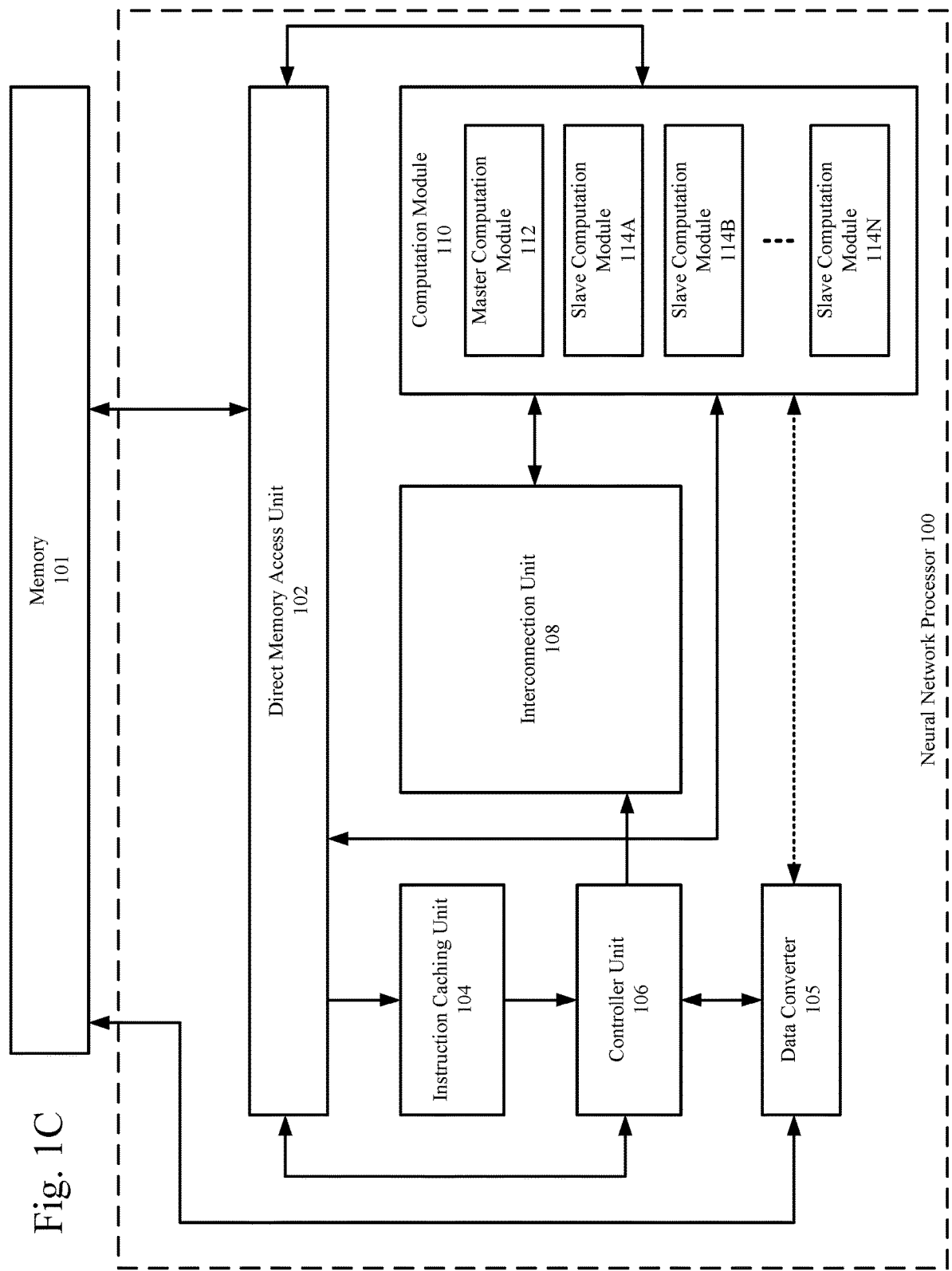
FIG. 1C illustrates a block diagram of another structure of a neural network processor for performing a backpropagation operation of artificial neural networks according to embodiments of the present disclosure.

FIG. 1C illustrates a block diagram of another structure of a neural network processor for performing a backpropagation operation of artificial neural networks according to embodiments of the present disclosure. As depicted, the data convert 105 may be configured to directly transmit the discrete data to the computation module 110. Further, the data converter 105 may be included in the computation module 110, e.g., in the master computation module 112 or in each of the slave computation modules 114.

Figure 2:
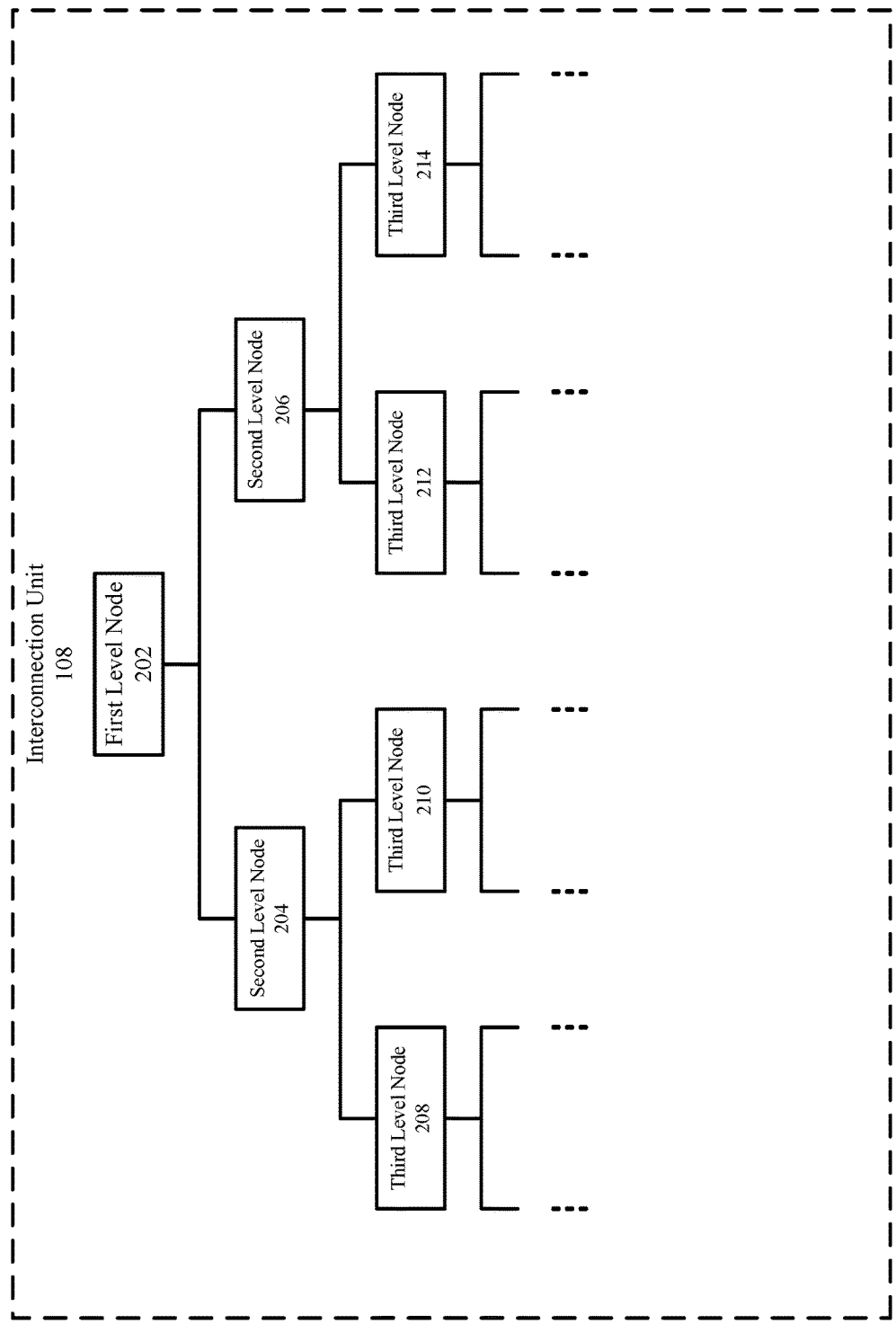
FIG. 2 illustrates the structure of the interconnection unit in the neural network processor for performing a backpropagation operation of artificial neural networks according to embodiments of the present disclosure.

FIG. 2 schematically shows an example structure of the interconnection unit 108 that constitutes a data channel between the master computation module 112 and the one or more slave computation modules 114. As depicted, the interconnection module 108 may be structured as a binary tree that includes multiple levels (e.g., from top level to lower levels). Each level may include one or more nodes. Each node may be configured to send data to two nodes at a lower level. Further, each node may combine or add data received from two nodes at a lower level. The combined data may be transmitted to a node at a higher level. For example, the received data (e.g., values a and b) from the two nodes at the lower level may be combined into a 2-dimensional vector (e.g., vector (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level and the sum of the addition may be sent to the node at the high level.

In the multilayer neural network, an input gradient vector may be calculated by the master computation module 112 and transmitted through the interconnection module 108, to the respective slave computation modules 114. Each of the slave computation modules 114 may be configured to parallelly calculate a portion of an output gradient vector, e.g., an element of the of output gradient vector. The portions of the output gradient vector may be combined or added by the nodes of the interconnection module 108 at the different levels. The root node (e.g., first level node 202) may output the output gradient vector based on the data collected from the nodes at the multiple lower levels.

Figure 3:
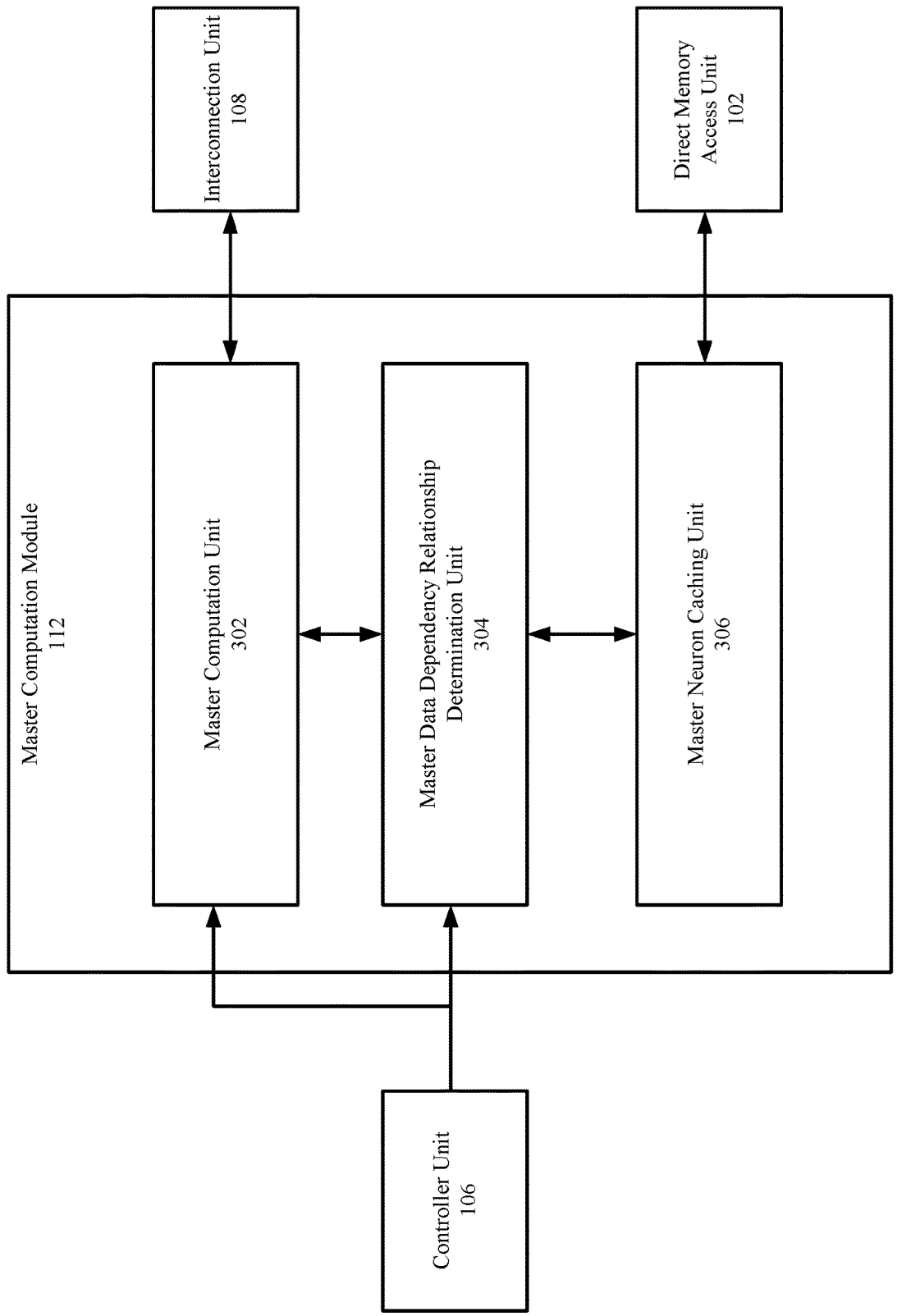
FIG. 3 illustrates a block diagram of the structure of a master computation module in the neural network processor for performing a backpropagation computation of artificial neural networks according to embodiments of the present disclosure.

FIG. 3 is an exemplary block diagram of a structure of the master computation module 112 of the apparatus for executing the backpropagation of the artificial neural network according to examples of the present disclosure. As shown in FIG. 3, the master computation module 112 comprises a master computation unit 302, a master data dependency relationship determination unit 304, and a master neuron caching unit 306. Hereinafter, a caching unit (e.g., the master neuron caching unit 306, a slave neuron caching unit 406, a weight value caching unit 408, etc.) may refer to an on-chip caching unit integrated in the MNN acceleration processor 100, rather than other storage devices in memory 101 or other external devices. In some examples, the on-chip caching unit may be implemented as an on-chip buffer, an on-chip Static Random Access Memory (SRAM), or other types of on-chip storage devices that may provide higher access speed than the external memory.

The master neuron caching unit 306 may be configured to cache or temporarily store data received from or to be transmitted to the direct memory access unit 102. The master computation unit 302 may be configured to perform various computation functions. The master data dependency relationship determination unit 304 may interface with the master computation unit 302 and the master neuron caching unit 306 and may be configured to prevent conflicts in reading and writing the data stored in the master neuron caching unit 306. For example, the master data dependency relationship determination unit 304 may be configured to determine whether there is a dependency relationship (i.e., a conflict) in terms of data between a micro-instruction which has not been executed and a micro-instruction being executed. If not, the micro-instruction may be allowed to be executed immediately; otherwise, the micro-instruction may not be allowed to be executed until all micro-instructions on which it depends have been executed completely. For example, all micro-instructions sent to the master data dependency relationship determination unit 304 may be stored in an instruction queue within the master data dependency relationship determination unit 304. In the instruction queue, if the target range of reading data by a reading instruction conflicts or overlaps with the target range of writing data by a writing instruction of higher priority in the queue, then a dependency relationship may be identified, and such reading instruction cannot be executed until the writing instruction is executed. Also, the master data dependency relationship determination unit 304 reads an input gradient vector from the master neuron caching unit 306 and then send the input gradient vector to the slave computation modules 114 through the interconnection module 108. The output data from the slave computation modules 114 may be directly sent to the master computation unit 302 through the interconnection module 108. Instructions output by the controller unit 106 are sent to the master computation unit 302 and the master data dependency relationship determination unit 304 to control the operations thereof.

In some examples, the master computation unit 302 may be configured to receive MNN data (e.g., input data, input neuron data, weight values, etc.) from the controller unit 106 or from the direct memory access unit 102. As described above, the master computation unit 302 may be configured to further transmit the MNN data to the one or more slave computation modules 114. Further operations performed by the master computation unit 302 are described below in greater detail with slave computation module 114N.

Figure 4:
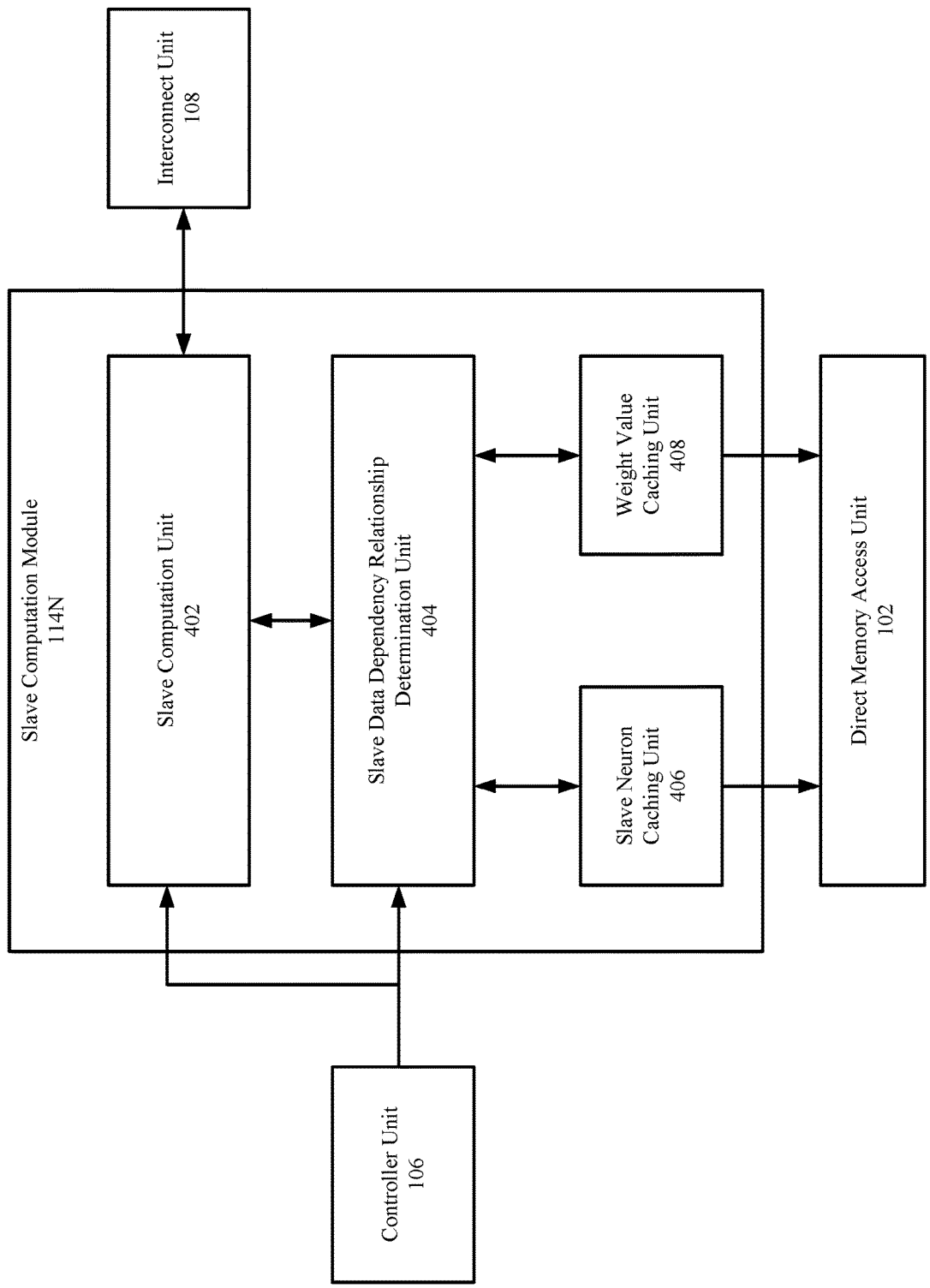
FIG. 4 is a block diagram of the structure of a slave computation module in the neural network processor for performing a backpropagation computation of artificial neural networks according to embodiments of the present disclosure.

FIG. 4 is an exemplary block diagram of a structure of one of the slave computation modules 114 (e.g., slave computation module 114N as shown) of the apparatus for executing the backpropagation of multilayer neural networks according to examples of the present disclosure. As shown in FIG. 4, the slave computation module 114N comprises a slave computation unit 402, a slave data dependency relationship determination unit 404, a slave neuron caching unit 406, a weight value caching unit 408 and a weight gradient caching unit 410.

The slave computation unit 402 may be configured to receive micro-instructions from the controller unit 106 and perform arithmetical logic operations according to the micro-instructions.

The slave data dependency relationship determination unit 404 may be configured to perform data access operations (e.g., reading or writing operations) on the caching units including the slave neuron caching unit 406, the weight value caching unit 408, and the weight gradient caching unit 410 during the computation process. The slave data dependency relationship determination unit 404 may be configured to prevent conflicts in reading and writing of the data in the caching units including the slave neuron caching unit 406, the weight value caching unit 408, and the weight gradient caching unit 410. For example, the slave data dependency relationship determination unit 404 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the slave data dependency relationship determination unit 404 may be stored in an instruction queue within the slave data dependency relationship determination unit 404. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The slave neuron caching unit 406 may be configured to cache or temporarily store data of the input gradient vector and portions of an output gradient vector calculated by the slave computation modules 114.

The weight value caching unit 408 may be configured to cache or temporarily store weight vectors for slave computation modules 114 in computation process. For each slave computation module, e.g., 114N, a column vector in a weight matrix corresponding to the slave computation module may be stored. A weight vector may refer to a vector that includes one or more weight values as the elements.

The weight gradient caching unit 410 may be configured to cache or temporarily store weight gradients for the corresponding slave computation modules to update weight values. Weight gradients stored by each slave computation module 114 may be corresponding to a weight vector stored by the weight value caching unit 408 in the same slave computation module.

The slave computation modules 114 may be configured to parallelly perform a portion of the backpropagation of multilayer neural network of each layer during the computation of the output gradient vector, and to update the weight values. Taking the multilayer neural network full connection layer (MLP) as an example, the process may be represented by the following equation: out_gradient=$w^T$*in_gradient, in which $w^T$ represents a transpose of a weight matrix includes the weight vectors, * represents a multiplication operation, in_gradient represents the input gradient vector output from the $(i+1)^{th}$ layer to the $i^{th}$ layer, and out_gradient represents an output gradient vector at the $i^{th}$ layer. Notably, during the backpropagation process, data flow may be opposite to that in the forward propagation process, which are both illustrated in FIG. 1A. As such, the in_gradient may refer to the output gradient 154B and the out_gradient may refer to the input data gradients 152B.

The multiplication between the transposed weight matrix $w^T$ and the input gradient vector in_gradient may be divided as multiple independent computing subtasks that may be parallelly executed simultaneously. In some examples, the output gradient vector out_gradient and the input gradient vector in_gradient may be column vectors. Each slave computation module 114 may be configured to only calculate a multiplication between the corresponding partial scalar elements in the input gradient vector in_gradient and a corresponding column vector in the weight matrix w. Each calculated result of the multiplication may be an intermediate result to be aggregated. That is, these intermediate results may be added and combined in the interconnection unit 108 to generate the output gradient vector. In other words, the computation process may include a parallel process of intermediate results computation by the slave computation modules 114 and a later process of aggregation (e.g., summation and combination) by the interconnection unit 108.

Each slave computation module 114 may be configured to simultaneously multiply the input gradient vector (e.g., output gradients 154B) by an input vector of this layer (e.g., input neuron data 152A) to obtain the weight gradients (e.g., weight gradients 152D) in order to update the weight values stored in the present slave computation module 114.

Forward propagation operation and backpropagation are two main processes in neural network algorithm. When neural network trains or updates weight values in the neural network, the neural network may first calculate an output vector based on an input vector at each layer of the forward propagation process (e.g., output neuron data 154A) and then layer-by-layer reversely train or update weight values of each layer according to the difference between the output vector (e.g., output neuron data 154A) and the input vector (e.g., input neuron data 152A). In the forward propagation process, output vectors of each layer (e.g., output neuron data 154A) and derivative values of the activation function may be stored such that the output vectors and the derivative values of the activation function may be available at the beginning of the backpropagation. The output vectors (e.g., output neuron data 154A) of each layer in the forward propagation operation may be received via the direct memory access unit 102 and cached in the master computation module 112. The output vectors may be further sent to the slave computation modules 114 through the interconnection module 108.

The master computation module 112 may be configured to perform subsequent computations based on the output gradient vectors generated at each layer during the backpropagation process. For example, an output gradient vector at the $(i+1)^{th}$ layer (e.g., input gradients 156B) may be multiplied by the derivative of the activation function in the forward propagation operation by the master computation module 112 to generate an input gradient vector at the $i^{th}$ layer (e.g., output gradients 154B). The derivatives of the activation function in the forward propagation operation may be stored and available at the time of starting backpropagation computation, which may be cached in the master computation module 112 through the direct memory access unit 102.

In some example, the calculation by the master computation module 112 may be based on the data type of the MNN data ((i.e., the input data and/or the weight values). For instance, the master computation unit 302 may be configured to first determine whether the received data is discrete data, continuous data, or hybrid data that includes both continuous data and discrete data. If the received data is determined to be continuous data, following processes at the master computation module 112 may be similar to conventional processes.

In an example where all the received data is determined to be discrete data, the master computation unit 302 may be configured to look up for a result in a prestored table. For example, a 2-bit discrete data may represent four discrete values (e.g., 00, 01, 10, 11 respectively represents −1, −0.5, 0.125, 2). With respect to each operation, a table may be created and prestored at the master computation unit 302. A table for addition may be created as follows.

TABLE 1

| Addition | −1 | −0.5 | 0.125 | 2 |
|---|---|---|---|---|
| −1 | −2 | −1.5 | −0.875 | 1 |
| −0.5 | −1.5 | −1 | −0.375 | 1.5 |
| 0.125 | −0.875 | −0.375 | 0.25 | 2.125 |
| 2 | 1 | 1.5 | 2.125 | 4 |

Similarly, other tables may be created respectively for other operations, such as multiplication, subtraction, etc.

In some other examples where the received data includes both continuous data and discrete data, the master computation unit 302 may be configured to select one or more operations from a group of prestored operations, the selected operation corresponding to the discrete value. The group of prestored operations may include bit manipulation operations such as bit shifting, bitwise AND, bitwise XOR (exclusive or), bitwise NOT, etc. For example, when the master computation unit 302 receives a discrete value 01 (representing −0.5 as previously indicated) and a continuous value 16 and the master computation unit 302 is instructed to perform a multiplication operation for the received values (i.e., −0.5×16), the master computation unit 302 may be configured to select one or more operations corresponding to the discrete value 01 in an index of multiplication operation. For example, in the index of multiplication, the discrete value 01 may be preset to correspond to a series of operations including inverting the sign bit of the continuous value (e.g., from 00010000 to 10010000) and right shifting the inverted continuous value by one bit (e.g., from 10010000 to 10001000). By applying the series of operation to the continuous value 16, the master computation unit 302 may generate the result of the multiplication operation, i.e., 10001000 or −8.

In a similar example, the master computation unit 302 may receive a discrete value 11 (representing 2 as previously indicated) and the same continuous value 16 and may be instructed to perform a division operation, i.e., 16 divided by 2. The master computation unit 302 may be configured to select one or more operations in an index of division. In this example, the discrete value 11 may be preset to correspond to right shifting the continuous value by one bit (e.g., from 00010000 to 00001000). By applying the right shifting operation to the continuous value 16, the master computation unit 302 may generate the result of the division operation, i.e., 00001000 or 8.

Figure 5:
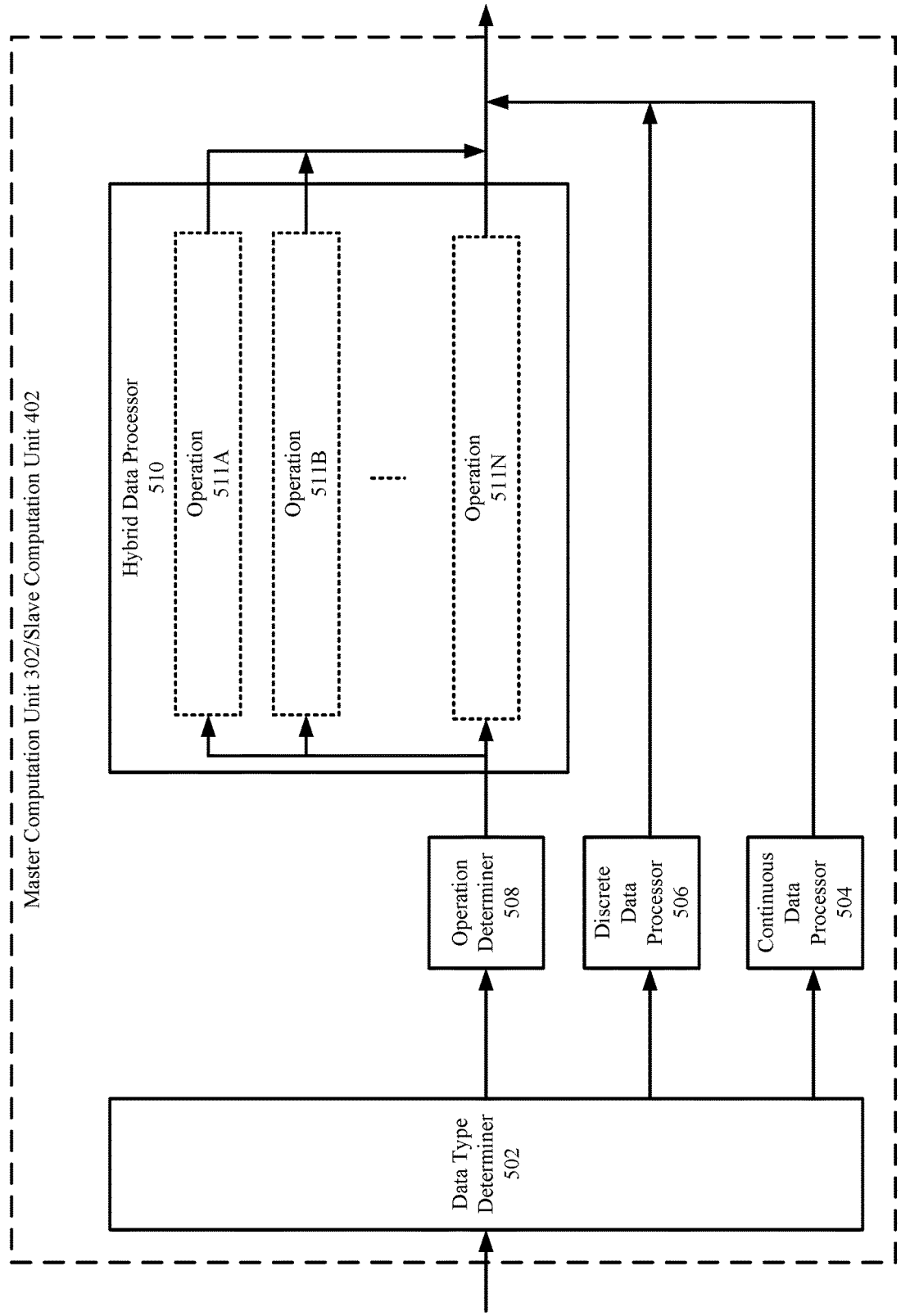
FIG. 5 is a block diagram of the structure of a master computation unit or a slave computation unit in the neural network processor for performing a backpropagation computation of artificial neural networks according to embodiments of the present disclosure.

The master computation unit 302 and components thereof are described in greater detail in accordance with FIG. 5.

Similar to the master computation module 112, the processing by the slave computation modules 114 may also be based on the data type of the input data or the weight values. For example, the slave computation module 114 may also be configured to determine the data type of the input data and/or the weight values and to process according to the determined data type (i.e., discrete data or continuous data). In more detail, the slave computation unit 402 may be configured to first determine whether the received data is discrete data, continuous data, or hybrid data that includes both continuous data and discrete data. If the received data is determined to be continuous data, following processes at the master computation module 114 may be similar to conventional processes. If the received data, at least, includes a portion of discrete data, the slave computation unit 402 may be configured, similar to the master computation unit 302, to search for a result from a prestored table (e.g., Table 1) or one or more operations from a prestored index. The slave computation unit 402 and components thereof are described in greater detail in accordance with FIG. 5

Referring to FIG. 5, a block diagram illustrates an example master computation unit 302 or an example slave computation unit 402 by which a backpropagation computation of artificial neural networks may be implemented in accordance with aspects of the present disclosure. As depicted, the example master computation unit 302 or the example slave computation unit 402 may include a data type determiner 502 that may be configured to determine the data type of the received MNN data (i.e., discrete data or continuous data). In more detail, the data type determiner 502 may be configured to determine if the received MNN data is continuous data, discrete data, or hybrid data that includes both continuous data and discrete data.

If the received MNN data is determined to be continuous data, following processes at the master computation module 112 and the slave computation modules 114 may be similar to conventional processes. That is, the received MNN data may be further transmitted to a continuous data process 504 configured to process If the received MNN data is determined to be discrete data, the MNN data may be further transmitted to a discrete data processor 506. In some examples, the discrete data processor 506 may be configured to look up for a result of an instructed calculation in a prestored table, rather than performing a calculation. For example, a 2-bit discrete data may represent four discrete values (e.g., 00, 01, 10, 11 respectively represents −1, −0.5, 0.125, 2). With respect to each operation such as addition, multiplication, subtraction, division, a table may be respectively created and prestored at the discrete data processor 506. For instance, Table 1 provided above may be prestored for addition. In an example where the discrete data processor 506 may be configured to perform an addition for discrete data 00 and 01, the discrete data processor 506 may be configured to search the result corresponding to −1 and −0.5 and generate the search result −1.5 as the result of addition.

If the receive MNN data is determined to be hybrid data that involves both continuous data and discrete data, the MNN data may be further transmitted to an operation determiner 508. The operation determiner 508 may be configured to determine and select one or more operations from a group of prestored operations (e.g., operation 511A, operation 511B . . . operation 511N). As described above, the group of prestored operations may include bit manipulation operations such as bit shifting, bitwise AND, bitwise XOR (exclusive or), bitwise NOT, etc.

For example, when the MNN data includes a discrete value 01 (representing −0.5 as previously indicated) and a continuous value 16 and the master computation unit 302 (or the slave computation unit 402) is instructed to perform a multiplication operation for the received values (i.e., −0.5× 16), the operation determiner 508 may be configured to select one or more operations corresponding to the discrete value 01 in an index of multiplication operation. For instance, the operation determiner 508 may be configured to select a series of operations including inverting the sign bit of the continuous value (e.g., from 00010000 to 10010000) and right shifting the inverted continuous value by one bit (e.g., from 10010000 to 10001000). A hybrid data processor 510 may be configured to apply the selected series of operations to the continuous value 16 to generate the result.

Figure 6:
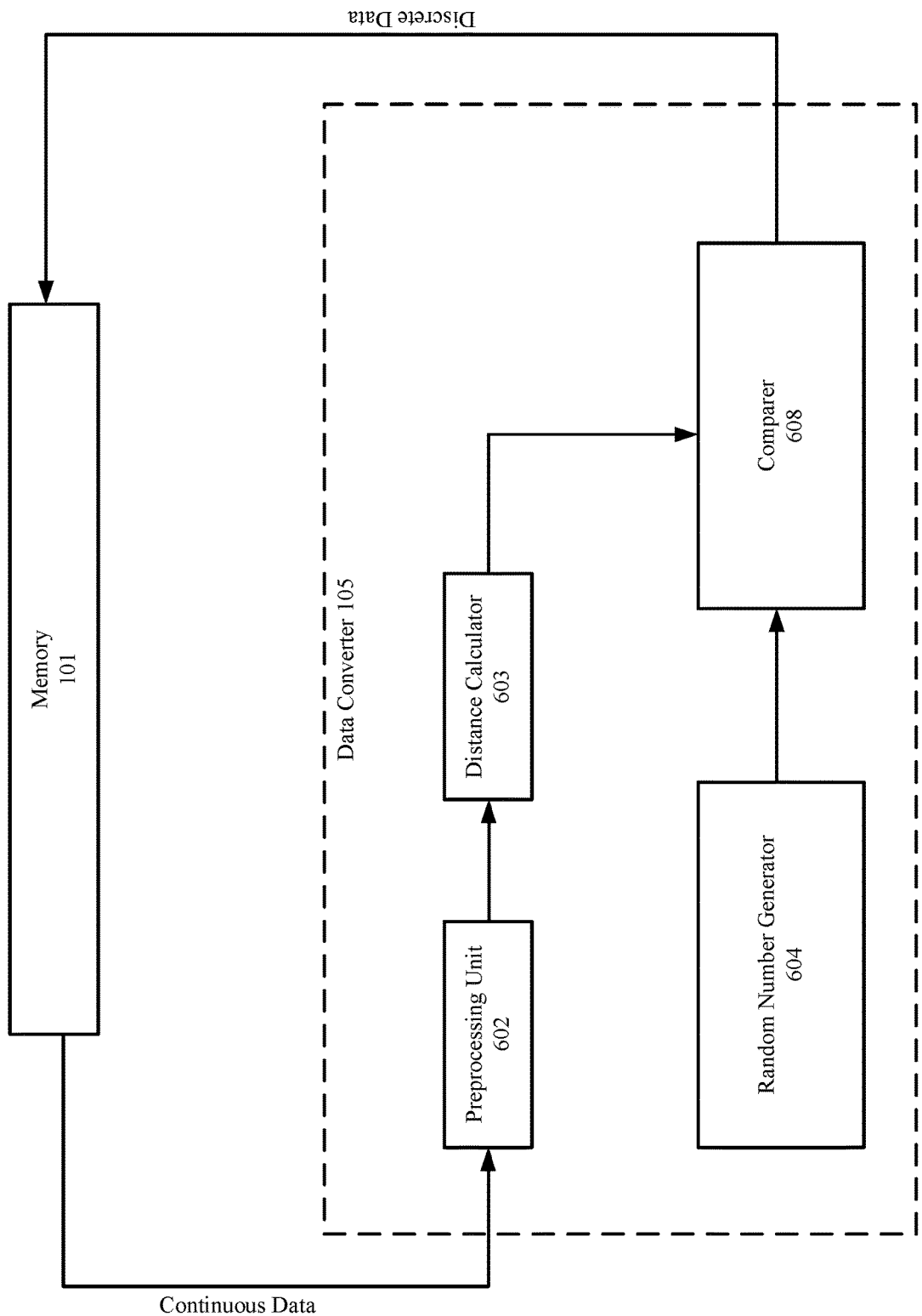
FIG. 6 is a block diagram of the structure of a data converter in the neural network processor for performing a backpropagation computation of artificial neural networks according to embodiments of the present disclosure.

Referring to FIG. 6, a block diagram illustrates an example data converter 105 by which a backpropagation computation of artificial neural networks may be implemented in accordance with aspects of the present disclosure. As depicted, the example data converter 105 may include a preprocessing unit 602, a distance calculator 603, a random number generator 604, and a comparer 608.

As described above, the data converter 105 may receive continuous data from the memory 101 and convert the continuous data into discrete data. The discrete data may then be transmitted back to the memory 101. In more detail, the controller unit 106 may be configured to send one or more instructions to the data converter 105. The instructions may specify the portions of continuous data to be converted into discrete data.

In some examples, a count of the discrete values for the process may be set to a number in the form of $2^n$ where n is an integer equal to or greater than 1. In some other examples, each discrete value may be set a value equal to $2^m$ where m is an integer, e.g., −1, −0.5, 0.125, 2. Further, the discrete values may be preselected, by a system administrator, from a data range, e.g., [−z, z].

The preprocessing unit 602 may be configured to perform a clipping operation to the received continuous data. That is, the preprocessing unit 602 may be configured to only keep the continuous data within the data range. Further, with respect to those continuous values that are greater than the upper limit of the data range (e.g., z), the preprocessing unit 602 may set those continuous values to a value equal to the upper limit (e.g., z). With respect to those continuous values that are less than the lower limit of the data range (e.g., −z), the preprocessing unit 602 may set those continuous values to a value equal to the lower limit (e.g., −z).

For instance, the received continuous data may include 10 continuous values (e.g., 0, 1, 2, 3, 4, 5, 6, 7, 8 and 9) and the data range may be set to [−4, 4]. The preprocessing unit 602 may be configured to keep the continuous values within the data range and set the continuous values that are greater than 4 to 4. Thus, the preprocessed data may be generated as 0, 1, 2, 3, 4, 4, 4, 4, 4, and 4. In some other examples, the data range may be set to [−1, 1] or [−2, 2].

Thus, the preprocessed values may be generated by the preprocessing unit 602. The preprocessed values that includes one or more continuous values may be transmitted to a distance calculator 603 for further operations.

The distance calculator 603 may be configured to calculate one or more distance values between the preprocessed values and the discrete values. A distance value may refer to an absolute value of a subtraction result between a preprocessed value and a discrete value. For example, the discrete values may be set as a number of values with the data range, e.g., −1, −0.5, 0.125, 2. A table of the distance values are provided below.

TABLE 2

| Distance | −1 | −0.5 | 0.125 | 2 |
|---|---|---|---|---|
| 0 | 1 | 0.5 | 0.125 | 2 |
| 1 | 2 | 1.5 | 0.875 | 1 |
| 2 | 3 | 2.5 | 1.875 | 0 |
| 3 | 4 | 3.5 | 2.875 | 1 |
| 4 | 5 | 4.5 | 3.875 | 2 |
| 4 | 5 | 4.5 | 3.875 | 2 |
| 4 | 5 | 4.5 | 3.875 | 2 |
| 4 | 5 | 4.5 | 3.875 | 2 |
| 4 | 5 | 4.5 | 3.875 | 2 |
| 4 | 5 | 4.5 | 3.875 | 2 |

The distance values may then be further transmitted to the comparer 608.

In some examples, the comparer 608 may be configured to generate one or more output discrete values as results of the conversion. In more detail, with respect to a continuous value, a discrete value that corresponds to a smallest distance value may be determined to represent the continuous value. For example, with respect to continuous value 0, the discrete value that corresponds to the smallest distance value is 0.125. The discrete value 0.125 may be determined to represent the continuous value 0 and generated as a part of the output discrete values.

Alternatively, with respect to a continuous value, the comparer 608 may be configured to calculate a normalization probability of either one of the two discrete values that correspond to the two smallest distance values. For example, with respect to continuous value 0, the comparer 608 may be configured to calculate the normalization probability for discrete values −0.5 or 0.125. The comparer 608 may then compare the normalization probability with a random number between 0 and 1, which is generated by a random number generator 604. If the normalization probability is greater than the random number, the comparer 608 may output the discrete value that corresponds to the normalization probability; otherwise, the compare 608 may output the other discrete value.

Figure 7:
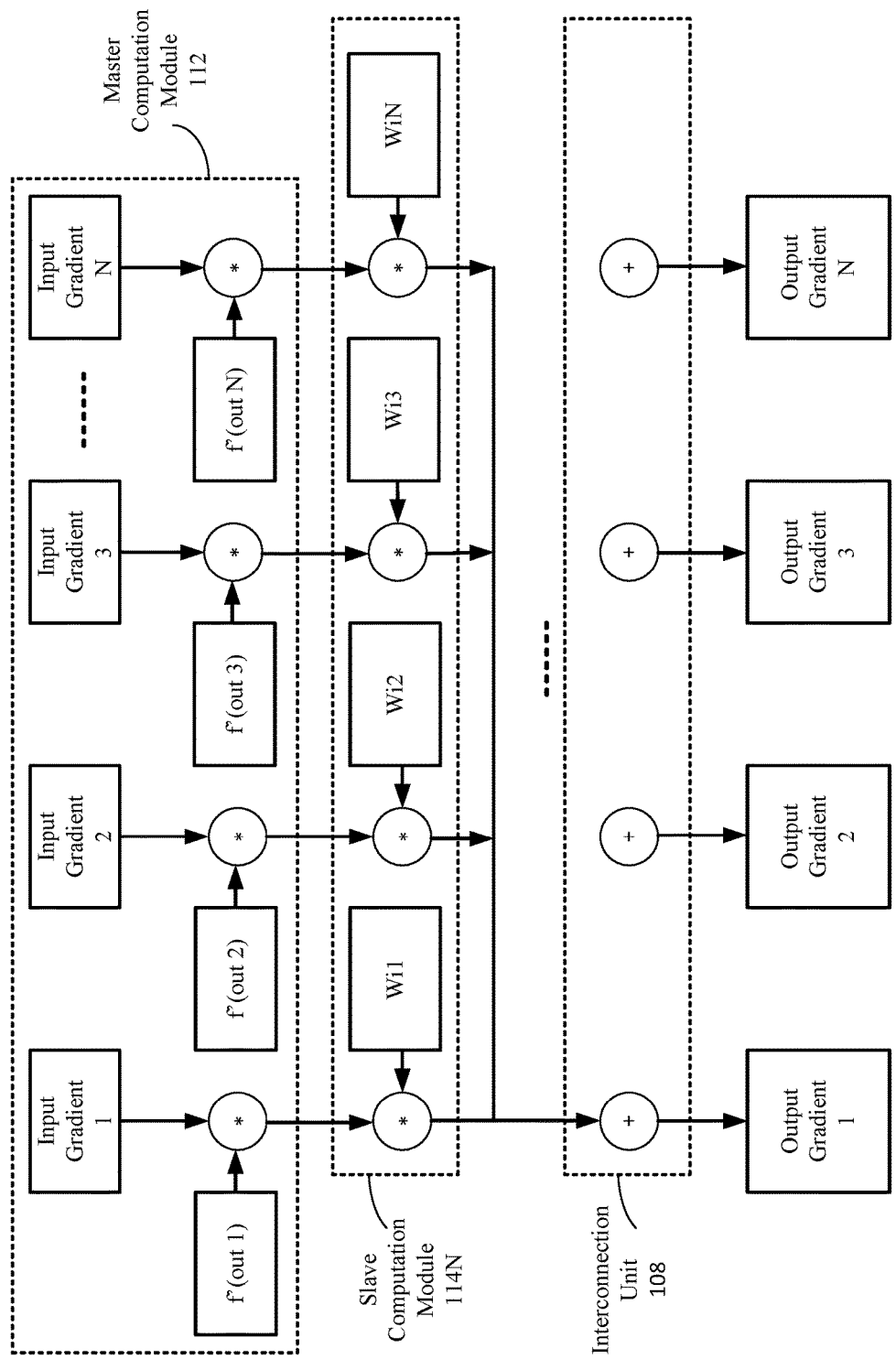
FIG. 7 is a block diagram of the backpropagation computation process of neural networks according to embodiments of the present disclosure.

FIG. 7 is an exemplary block diagram of a process of executing the backpropagation of the multilayer neural network according to examples of the present disclosure.

The process of calculating the output gradient vector may be represented in accordance with the following equation: out_gradient=$w^T$*in_gradient, in which the matrix vector multiplication between a transpose of the weight matrix w and the input gradient vector in_gradient may be divided into independent parallel computing subtasks. Each slave computation module 114 may be configured to calculate a portion of the output gradient vector as an intermediate result. Summation operations may be performed on the intermediate results in the interconnection unit 108 to generate the output gradient vector.

As depicted in FIG. 7, an input gradient vector generated by a previous layer in the backpropagation operation (e.g., input data gradients 156B) may be multiplied with a corresponding derivative of the activation function and further multiplied with the weight matrix to generate the output gradient vector (e.g., output gradients 154B).

With reference to FIG. 7, a vector (e.g., [input gradient1, . . . , input gradientN] in FIG. 7) may be output from the $(i+1)^{th}$ layer (e.g., input data gradients 156B in FIG. 1A) to the $i^{th}$ layer. The vector may be multiplied by a derivative value of an activation function (e.g., [f'(out1), . . . , f'(outN)] in FIG. 7) of the $i^{th}$ layer to obtain the input gradient vector of the $i^{th}$ layer (e.g., output gradients 154B). It is notable that, in the backpropagation process, operations may be performed following the dotted lines and arrows in FIG. 1A. Thus, the input gradient vector of the $i^{th}$ layer may be labeled as "output gradients 154B," for example, in FIG. 1A.

Further, as shown in FIG. 7, the above multiplication may be performed in the master computation module 112. The input gradient vector of the $i^{th}$ layer may then be transmitted via the interconnection unit 108 to the slave computation modules 114 and temporarily stored in the slave neuron caching unit 406 of the slave computation modules 114. Then, the input gradient vector of the it h layer may be multiplied by the weight matrix to calculate intermediate results. For example, the $i^{th}$ slave computation module may be configured to calculate an outer product between the $i^{th}$ scalar of the input gradient vector and a column vector $[W_{i1}, \ldots, W_{iN}]$ in the weight matrix, and the calculated intermediate results may be added and combined to generate the output gradient vector (shown as [output gradient1, . . . , output gradientN] in FIG. 7).

Further, the slave computation modules 114 may be configured to update weight values stored therein. The process of updating weight gradients may represented as the following equation: dw_ij=x_j*in_gradient_i, in which x_j is the $j^{th}$ element of the input vector (e.g., input data 152A; i.e., the output data of the $(i-1)^{th}$ layer) of the $i^{th}$ layer in the forward propagation operation, and in_gradient_i is the $i^{th}$ element of the input gradient vector, e.g., output gradients 154B (i.e., the product of input gradient and derivative f' in FIG. 7) of the $i^{th}$ layer in the backpropagation computation, dw_ij may refer to a matrix including the weight gradients 152D, and * may refer to an outer product multiplication operation. The inputs of the $i^{th}$ layer in forward propagation operation may be stored and available at the beginning of the backpropagation. The inputs of the $i^{th}$ layer may be sent to the slave computation modules 114 through the interconnection unit 108 and temporarily stored in the slave neuron caching unit 406. In the slave computation modules 114, after completion of calculating the intermediate results of the output gradient vector, the $i^{th}$ scalar of the input gradient vector (e.g., output gradients 154B) may be multiplied (e.g., outer product multiplication) by the input vector of the $i^{th}$ layer (e.g., input data 152A) in the forward propagation operation to generate weight gradients (e.g., weight gradients 152D), and to accordingly update the weight value 152C.

Figure 8:
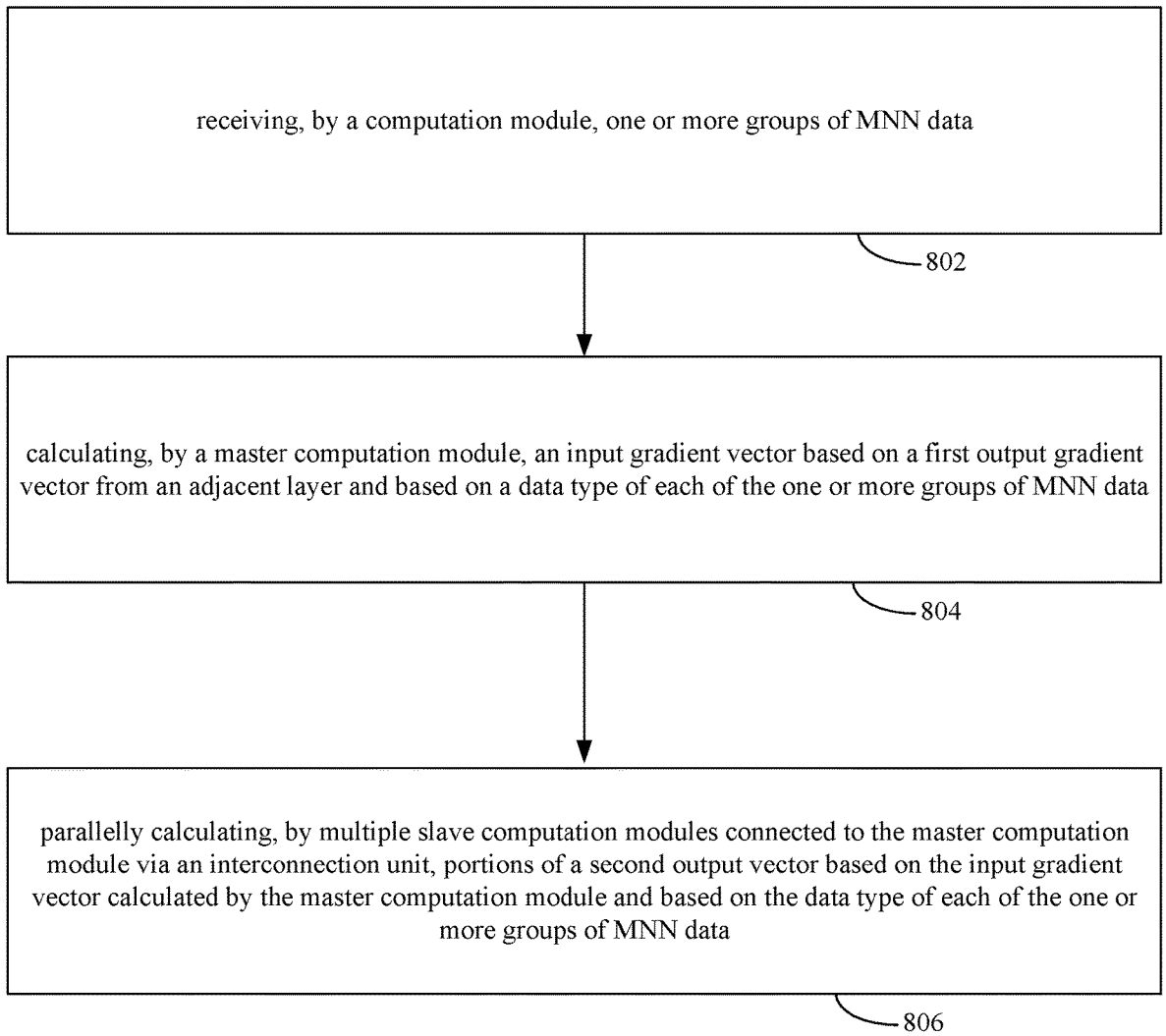
FIG. 8 is a flow diagram of aspects of an example method for backpropagation computation process of neural networks according to embodiments of the present disclosure.

Referring to FIG. 8, a flow chart shows aspects of an example method 800 for backpropagation of a multilayer neural network in accordance with aspects of the present disclosure. The method may be performed by one or more components of the apparatus of FIG. 1B and the components thereof in FIGS. 3, 4, 5, and 6.

At block 802, the example method 800 may include receiving, by a computation module, one or more groups of MNN data. For example, the computation module 110 may be configured to receive one or more groups of MNN data. The MNN data may include the input data and the weight values. At least a portion of the input data and the weight values are presented or stored as discrete values. The direct memory access unit 102 may be configured to access an external address range (e.g., in an external storage device such as a memory 101) and directly read or write data into respective caching units in the computation module 110.

At block 804, the example method 800 may include calculating, by the master computation module 112, an input gradient vector based on a first output gradient vector from an adjacent layer and based on a data type of each of the one or more groups of MNN data. For example, a vector (e.g., [input gradient1, . . . , input gradientN] in FIG. 7) may be output from the $(i+1)^{th}$ layer (e.g., input data gradients 156B in FIG. 1A) to the $i^{th}$ layer. The vector may be multiplied, by the master computation module 112, by a derivative value of an activation function (e.g., [f'(out1), . . . , f'(outN)] in FIG. 7) of the $i^{th}$ layer to obtain the input gradient vector of the $i^{th}$ layer (e.g., output gradients 154B).

At 806, the example method 800 may further include parallelly calculating, by one or more slave computation modules 114 connected to the master computation module 112 via the interconnection unit 108, portions of a second output vector based on the input gradient vector calculated by the master computation module 112 and based on the data type of each of the one or more groups of MNN data.

For example, The input gradient vector of the it h layer may then be transmitted via the interconnection unit 108 to the slave computation modules 114 and temporarily stored in the slave neuron caching unit 406 of the slave computation modules 114. Then, the input gradient vector of the $i^{th}$ layer may be multiplied by the weight matrix to calculate intermediate results. For example, the $i^{th}$ slave computation module may be configured to calculate an outer product between the $i^{th}$ scalar of the input gradient vector and a column vector $[W_{i1}, \ldots, W_{iN}]$ in the weight matrix, and the calculated intermediate results may be added and combined to generate the output gradient vector (shown as [output gradient1, . . . , output gradientN] in FIG. 7).

Further, the slave computation modules 114 may be configured to update weight values stored therein. The process of updating weight gradients may represented as the following equation: dw_ij=x_j*in_gradient_i, in which x_j is the $j^{th}$ element of the input vector (e.g., input data 152A; i.e., the output data of the $(i-1)^{th}$ layer) of the $i^{th}$ layer in the forward propagation operation, and in_gradient_i is the $i^{th}$ element of the input gradient vector, e.g., output gradients 154B (i.e., the product of input gradient and derivative f' in FIG. 7) of the $i^{th}$ layer in the backpropagation computation, dw_ij may refer to a matrix including the weight gradients 152D, and * may refer to an outer product multiplication operation. The inputs of the $i^{th}$ layer in forward propagation operation may be stored and available at the beginning of the backpropagation. The inputs of the $i^{th}$ layer may be sent to the slave computation modules 114 through the interconnection unit 108 and temporarily stored in the slave neuron caching unit 406. In the slave computation modules 114, after completion of calculating the intermediate results of the output gradient vector, the $i^{th}$ scalar of the input gradient vector (e.g., output gradients 154B) may be multiplied (e.g., outer product multiplication) by the input vector of the $i^{th}$ layer (e.g., input data 152A) in the forward propagation operation to generate weight gradients (e.g., weight gradients 152D), and to accordingly update the weight value 152C.

The utilization of the apparatus and instruction set for performing the backpropagation computation of artificial neural networks may eliminate the defects caused by lower performance of CPU and GPU operation as well as high overhead of front-end transcoding, which effectively improves the support to forward computations of multi-layer artificial neural networks.

In addition, the utilization of a specific on-chip cache for the backpropagation computation of multi-layer artificial neural network thoroughly explores the reusability of input neurons and weight data and avoids the repeatedly reading of data from memory. The requirement for memory access bandwidth is also lowered and thus the memory bandwidth will not become a bottleneck for performance of the backpropagation computation of multi-layer artificial neural networks.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for backpropagation of a multilayer neural network (MNN), comprising:
    a computation circuit configured to receive one or more groups of MNN data,
        wherein the one or more groups of MNN data include input data and one or more weight values,
        wherein at least a portion of the input data and the weight values are presented as discrete values,
        wherein each of the discrete values is associated with a predetermined bitwise operation to be performed on the one or more groups of MNN data,
        wherein an association between each of the discrete values and the predetermined bitwise operation is stored in a lookup table,
        wherein the lookup table corresponds to one of one or more arithmetic operations, and
        wherein the computation circuit includes:
            a master computation circuit configured to calculate an input gradient vector based on a first output gradient vector from an adjacent layer and based on a data type of each of the one or more groups of MNN data, wherein the master computation circuit is further configured to select, from multiple predetermined bitwise operations, one or more operations corresponding to the discrete values and perform the one or more selected operations to calculate the input gradient vector, and
            one or more slave computation circuits configured to parallelly calculate portions of a second output vector based on the input gradient vector calculated by the master computation circuit and based on the data type of each of the one or more groups of MNN data; and
    a controller circuit configured to decode an instruction that initiates a backpropagation process and transmit the decoded instruction to the computation circuit.

2. The apparatus of claim 1, further comprising an interconnection circuit configured to combine the portions of the second output gradient vector to generate the second output gradient vector.

3. The apparatus of claim 1, wherein the slave computation circuits are further configured to:
    parallelly calculate gradients of weight values based on the input gradient vector; and
    update the weight values based on the respectively calculated gradients.

4. The apparatus of claim 1, wherein the master computation circuit is further configured to respectively multiply each element of the input gradient vector with a derivative of an activation function of the adjacent layer.

5. The apparatus of claim 2,
wherein the interconnection circuit is structured as a binary tree including one or more levels, each of which includes one or more nodes,
wherein each of the nodes at one level is connected to two nodes at a lower level, and
wherein each of the nodes transmits same data to the two nodes at the lower level and combines data received from the two nodes at the lower level.

6. The apparatus of claim 1, wherein the master computation circuit includes:
a master neuron caching circuit configured to cache data;
a master computation subcircuit configured to receive the first output gradient vector from the interconnection circuit; and
a master data dependency relationship determination circuit configured to temporarily prevent the instruction from being executed based on a determination that a conflict exists between the instruction and other instructions.

7. The apparatus of claim 1, wherein each of the slave computation circuits includes:
a slave computation subcircuit configured to receive the one or more groups of micro-instructions and to perform arithmetic logical operations; and
a slave data dependency relationship determination circuit configured to perform data access operations to a slave neuron caching circuit, a weight value caching circuit, and a weight gradient caching circuit based on a determination that no conflict exists between the data access operations.

8. The apparatus of claim 1, wherein the instruction is selected from the group consisting of
a CONFIG instruction for configuring constants required by computation of the current layer prior to starting computation of each layer,
a COMPUTE instruction for completing arithmetical logic computation of the multilayer neural network of each layer, and
an IO instruction for reading in the input data required by computation from an external address space and storing processed data back into the external space after completion of computation.

9. The apparatus of claim 6, wherein the master computation subcircuit includes:
an operation determiner circuit configured to determine an operation to be performed based on the data type of the input data; and
a hybrid data processor configured to perform the determined operation.

10. The apparatus of claim 7, wherein the slave computation subcircuit includes:
an operation determiner circuit configured to determine an operation to be performed based on the data type of the input data; and
a hybrid data processor configured to perform the determined operation.

11. The apparatus of claim 9, wherein the master computation subcircuit further includes:
a data type determiner circuit configured to determine the data type of the input data; and
at least one of a discrete data processor or a continuous data processor,
wherein the discrete data processor is configured to process the input data based on a determination that the input data is stored as discrete values, and
wherein the continuous data processor is configured to process the input data based on a determination that the input data is stored as continuous values.

12. The apparatus of claim 1, further comprising a data converter configured to convert continuous data to discrete data, wherein the data converter includes:
a preprocessing circuit configured to clip a portion of the input data that is within a predetermined range to generate preprocessed data;
a distance calculator circuit configured to calculate multiple distance values between the preprocessed data and multiple discrete values; and
a comparer circuit configured to compare the multiple distance values to output one or more of the multiple discrete values.

13. A method for backpropagation of a multilayer neural network (MNN), comprising:
receiving, by a computation circuit, one or more groups of MNN data,
wherein the one or more groups of MNN data include input data and one or more weight values, and
wherein at least a portion of the input data and the weight values are presented as discrete values,
wherein each of the discrete values is associated with a predetermined bitwise operation to be performed on the one or more groups of MNN data,
wherein an association between each of the discrete values and the predetermined bitwise operation is stored in a lookup table, and
wherein the lookup table corresponds to one of one or more arithmetic operations;
calculating, by a master computation circuit of the computation circuit, an input gradient vector based on a first output gradient vector from an adjacent layer and based on a data type of each of the one or more groups of MNN data, wherein the calculating includes selecting, by the master computation circuit, from multiple predetermined bitwise operations, one or more operations corresponding to the discrete values and performing the one or more selected operations to calculate the input gradient vector; and
parallelly calculating, by one or more slave computation circuits connected to the master computation circuit via an interconnection circuit, portions of a second output vector based on the input gradient vector calculated by the master computation circuit and based on the data type of each of the one or more groups of MNN data.

14. The method of claim 13, further comprising:
combining, by the interconnection circuit, the portions of the second output gradient vector to generate the second output gradient vector.

15. The method of claim 13, further comprising:
parallelly calculating, by the slave computation circuits, gradients of weight values based on the input gradient vector, and
updating, by the slave computation circuits, the weight values based on the respectively calculated gradients.

16. The method of claim 13, further comprising respectively multiplying, by the master computation circuit, each element of the input gradient vector with a derivative of an activation function of the adjacent layer.

17. The method of claim 14,
wherein the interconnection circuit is structured as a binary tree including one or more levels, each of which includes one or more nodes,
wherein each of the nodes at one level is connected to two nodes at a lower level, and
wherein each of the nodes transmits same data to the two nodes at the lower level and combines data received from the two nodes at the lower level.

18. The method of claim 13, further comprising:
caching, by a master neuron caching circuit, the input data;
receiving, by a master computation subcircuit, the first output gradient vector from the interconnection circuit; and
temporarily preventing, by a master data dependency relationship determination circuit, the instruction from being executed based on a determination that a conflict exists between the instruction and other instructions.

19. The method of claim 13, further comprising:
receiving, by a slave computation subcircuit of each of the slave computation circuits, the one or more groups of micro-instructions;
performing, by the slave computation subcircuit, arithmetic logical operations according to the micro-instructions;
performing, by a slave data dependency relationship determination circuit of each of the slave computation circuits, data access operations to a slave neuron caching circuit, a weight value caching circuit, and a weight gradient caching circuit based on a determination that no conflict exists between the data access operations.

20. The method of claim 18, further comprising:
determining, by an operation determiner circuit of the master computation subcircuit, an operation to be performed based on the data type of the input data; and
performing, by a hybrid data processor of the master computation subcircuit, the determined operation.

21. The method of claim 19, further comprising:
determining, by an operation determiner circuit of the slave computation subcircuit, an operation to be performed based on the data type of the input data; and
performing, by a hybrid data processor circuit of the slave computation subcircuit, the determined operation.

22. The method of claim 20, further comprising:
determining, by a data type determiner circuit, the data type of the input data;
processing, by a discrete data processor, the input data based on a determination that the input data is stored as discrete values; and
processing, by a continuous data processor, the input data based on a determination that the input data is stored as continuous values.

23. The method of claim 13, further comprising:
clipping, by a preprocessing circuit of a data converter circuit, a portion of the input data that is within a predetermined range to generate preprocessed data;
calculating, by a distance calculator circuit of the data converter circuit, multiple distance values between the preprocessed data and multiple discrete values; and
comparing, by a comparer circuit of the data converter circuit, the multiple distance values to output one or more of the multiple discrete values.

* * * * *